L. N. MORSCHER.
GRADER.
APPLICATION FILED OCT. 19, 1908.
967,411.
Patented Aug. 16, 1910.
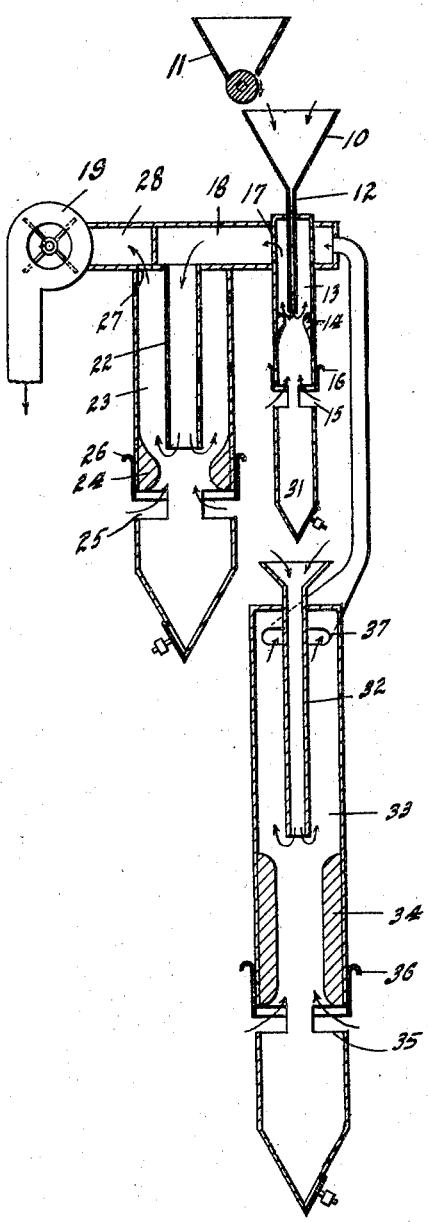
Witnesses
Frank A. Fahle
Thomas W. McMeans
Inventor
Lawrence N. Morscher,
By Bradford Wood
Attorneys

UNITED STATES PATENT OFFICE.

LAWRENCE N. MORSCHER, OF LAWRENCE, KANSAS, ASSIGNOR TO WILLIAM J. EHRSAM, OF ENTERPRISE, KANSAS, AND LAWRENCE N. MORSCHER, OF LAWRENCE, KANSAS, COTRUSTEES.

GRADER.

967,411.  Specification of Letters Patent.  Patented Aug. 16, 1910.

Application filed October 19, 1908. Serial No. 458,556.

*To all whom it may concern:*

Be it known that I, LAWRENCE N. MORSCHER, a citizen of the United States, residing at Lawrence, in the county of Douglas and State of Kansas, have invented certain new and useful Improvements in Graders, of which the following is a specification.

The object of my present invention is to provide an apparatus by means of which a particle-laden fluid stream may be given a considerable velocity; the fluid be caused to traverse transversely the normal trajectory of the particles as they leave the discharge end of the initial stream-defining member, and the particles in their normal trajectory be also subjected to a reverse fluid current which will further deflect, arrest and reverse the movement of particles having a mass less than the mass of differentiation and cause such particles to wholly depart from their normal trajectory and pass onward with the fluid stream, the initial fluid stream and the deflecting fluid stream being preferably produced by such means that their velocity will be sufficiently in excess of the possible velocities acquirable in the apparatus by the free falling of the particles as to render such free falling negligible, and the fluid currents being also preferably produced by such means as to maintain their relative ratio irrespective of actual velocities.

The apparatus may be used for the grading of any granular material, such for instance as grain, flour, cement, gypsum, comminuted ores, etc.

The drawing illustrates a medial section of an apparatus embodying my invention, it being understood however that the drawing, while completely disclosing the invention, is entirely diagrammatic, no attempt being made to reproduce the exact proportions of the parts, such proportions being dependent upon the materials to be operated upon.

In the drawing, 10 indicates a hopper open to the reception of the particles to be graded (for instance from a feed hopper 11) and also to a supply of the fluid which is to form the carrying stream.

In the present case the structure is indicated for the use of air as a fluid current and wherever the term "air" is used it is to be understood as equivalent to "fluid."

The hopper 10 delivers into a stream-defining member or tube 12 which may be of any desired cross section. The tube 12 is projected into a separating chamber 13 which, immediately beyond the discharge end of tube 12, is constricted at 14 and beyond the constriction 14 is provided with air inlets 15 the size of which may be controlled by suitable valves 16, the inlets 15 being evenly distributed around the chamber. The chamber 13 at a point behind the discharge end of tube 12 communicates through openings 17 with a suction chamber 18 which is connected with a suitable suction fan 19, or other means for producing the fluid stream at a desired velocity. If a single separation is all that is required the chamber 18 will connect directly with the fan 19 but if other separation is desired chamber 18 will discharge into a tube 22 like the tube 12 said tube projecting into a chamber 23 which, in front of the discharge end of tube 22 is constricted at 24 and provided with air inlets 25 controlled by valves 26, the chamber 23 communicating, at a point behind the discharge end of the tube 22, through opening 27 with the suction chamber 28.

The particles separated from the fluid stream at the discharge end of tube 12 may pass into a collecting chamber 31 and, if it is desired to further grade this material it may discharge into a tube 32 like tube 12 and arranged in a chamber 33 constricted at 34 and provided with air inlets 35 and valves 36, the rear end of chamber 33 communicating by passages 37 either with the suction chamber 28 or with the suction chamber 18. In the last mentioned case the particle-laden fluid stream from chamber 33 would join a similar stream from chamber 13 and the two together pass into tube 22.

In operation, the particle-laden fluid stream passing inward through tube 12 reaches the discharge end of said tube. The velocities at this point are considerable, so that normally the particles would tend to continue in straight lines into the collecting chamber 31, but the fluid stream is deflected and reversed toward the openings 17 and suction chamber 18, thus traversing transversely the stream of particles and tending to deflect said particles to some extent from the normal trajectory. At the same time a stream of air is being drawn in through openings 15 with a velocity sufficiently great to lift even the particles of heaviest mass provided said particles had no velocity in an opposite direction, said incoming air current joining the reversed air currents which entered through tube 12. As a consequence all of the particles are affected to a greater or less extent by the air current entering through openings 15 but those particles of a mass exceeding the mass of differentiation, which is dependent upon the ratio between the lifting effect of the incoming air current on any given particle and the inertia effect of the projected particles (which ratio remains constant where the velocities are sufficiently high, irrespective of changes of velocities and practically independent of gravity) pass on into the chamber 31 while the particles of a mass less than the mass of differentiation are first arrested and then reversed in their movement and carried rearward with the air current into the suction chamber 18. The effect of any given projectile upon the retarding medium may properly be termed the inertia effect, as above stated, and this is proportional to the square of the velocity with which the projectile is traveling through the retarding medium. And the lifting or deflecting force of the deflecting current is also proportional to the square of the velocity so that if the velocities be considerably greater than the velocity which could be produced in any given particle by gravity acting through the distance of projection, it will be seen that the effect of gravity will become relatively so small, as compared to the effect due to the projectile and deflecting velocities that the effect of gravity can be practically neglected. In order that the operation may be more thoroughly understood I give herewith a statement of actual results of some experiments with an apparatus embodying my invention. An apparatus like that shown in the drawing was produced in the tube 12 at a vertical height of 28 inches (7/3 ft.) and the fan 19 drew a stream of air down through this tube at a velocity of about 100 feet per second. Into this stream of air the particles to be separated were fed and both by calculation and experiment, it was found that the particle equivalent to the sphere 1/20th of an inch in diameter and unit density would acquire a velocity, due to the air current, at the inner end of the tube 12, of 47 feet per second and that the time of passage of this particle through the tube would be .082 seconds. The energy of this particle in foot pounds, due to the velocity imparted by the air current, would be equal to $$\frac{m(47)^2}{G}$$

while the energy due to gravity acting on the same particle through the same space, would be $$\frac{7mg}{3G}$$

where $g$ equals the force of gravity at the given place and G equals the force of gravity at the place of standardization but for ordinary purposes $g$ is taken as equal to G so that the energy due to gravity would be $$\frac{7m}{3}$$

foot pounds. This is about 7% of the energy due to the velocity of projection and an increase of the velocity of about 3.5%. Consequently, assuming the tube 12 to be vertical, the penetrating effect of the particle under consideration upon the deflecting ascending current will be about 7.5 inches, instead of 7.28 as it would be if gravity had no effect upon the particle. In other words, the point of the opening 15 relative to the inner or discharging end of the tube 12, with said tube 12 vertical, would, in the particular instance under consideration, be 7.5 inches instead of 7.28 inches. In other words, assuming the particles to be graded to average 1/20th inch in diameter, the particles failing to penetrate the deflecting current would be 3% larger than they would be if gravity had no effect. If the velocities stated were doubled the change would be from 3% to about 1% of equivalent increase in size but if the separation depended, as in aspirators, upon the lifting and transporting effect of the deflecting fluid current, as opposed to the gravity, the effect would be an increase of 300%. It is to be seen therefore that in the operation of the apparatus as I have described it, gravity has but a negligible effect. Of course the operation of the other separators is exactly the same and needs not to be further described.

I claim as my invention:—

1. In a machine for separating a mixture of pulverulent material of nearly equally sized particles into separate grades, the combination, with a conduit, a separating chamber into which the discharge end of said conduit is projected, said separating chamber having an outlet leading therefrom, at a point behind the discharge end of the conduit, and having a fluid inlet beyond the discharge end of said conduit but between said discharge end and any mechanical obstruction in the line of discharge of said conduit, and means for moving a fluid stream through said conduit into the chamber and through said inlet into the chamber, and from the chamber through the outlet thereof, at a velocity through the conduit considerably in excess of the free falling velocity attainable by any particle through said conduit when filled with the fluid of which the transporting stream is composed.

2. In a machine for separating a mixture of pulverulent material of nearly equally sized particles into separate grades, the combination, with a conduit, a separating chamber into which the discharge end of said conduit is projected, said separating chamber having an outlet leading therefrom at a point behind the discharge end of the conduit, and having a fluid inlet beyond the discharge end of said conduit but between said discharge end and any mechanical obstruction in the line of discharge of said conduit, and a suction fan having its supply passage connected to the outlet of the separating chamber and of such capacity as to produce, in the conduit, a velocity considerably in excess of the free falling velocity attainable by any particle through said conduit when filled with the fluid of which the transporting stream is composed.

3. The combination, with a main chamber, of a smaller fluid-stream-defining tube discharging unobstructedly into said main casing at a point intermediate in its length and having its discharging end entirely separated from the walls of the main casing, a suction fan communicating with the main chamber back of the discharge end of the tube, and fluid-stream inlets leading into the chamber beyond the discharge end of the chamber but between the discharge end of said tube and any obstruction in the line of discharge of said tube.

4. The combination, with a main chamber, of a smaller fluid-stream-defining tube discharging unobstructedly into said main casing at a point intermediate in its length and having its discharging end entirely separated from the walls of the main casing, a constricted passage formed in the main chamber beyond the discharge end of the tube, a suction fan communicating with the main chamber back of the discharge end of the tube, and fluid-stream inlets leading into the chamber beyond the discharge end of the chamber, and beyond the constricted passage.

In witness whereof, I have hereunto set my hand and seal at Indianapolis, Indiana, this sixth day of October, A. D. one thousand nine hundred and eight.

LAWRENCE N. MORSCHER. [L. S.]

Witnesses:
ARTHUR M. HOOD,
THOMAS W. MCMEANS.